(12) United States Patent
Danskin

(10) Patent No.: US 8,775,229 B1
(45) Date of Patent: Jul. 8, 2014

(54) METHOD OF CORRECTING A PROJECT SCHEDULE

(75) Inventor: John M. Danskin, Providence, RI (US)

(73) Assignee: NVIDIA Corporation, Santa Clara, CA (US)

( * ) Notice: Subject to any disclaimer, the term of this patent is extended or adjusted under 35 U.S.C. 154(b) by 1870 days.

(21) Appl. No.: 11/608,149

(22) Filed: Dec. 7, 2006

(51) Int. Cl.
    *G06Q 10/00*     (2012.01)
    *G06Q 10/06*     (2012.01)

(52) U.S. Cl.
    CPC .. *G06Q 10/06312* (2013.01); *G06Q 10/063116* (2013.01)
    USPC .......................................... 705/7.22; 705/7.16

(58) Field of Classification Search
    None
    See application file for complete search history.

(56) References Cited

U.S. PATENT DOCUMENTS

| | | | | |
|---|---|---|---|---|
| 4,942,527 | A * | 7/1990 | Schumacher | 705/7.15 |
| 5,172,313 | A * | 12/1992 | Schumacher | 705/7.27 |
| 5,189,606 | A * | 2/1993 | Burns et al. | 705/7.23 |
| 5,195,172 | A * | 3/1993 | Elad et al. | 706/62 |
| 5,428,712 | A * | 6/1995 | Elad et al. | 706/46 |
| 5,719,795 | A * | 2/1998 | Menkus et al. | 703/2 |
| 5,842,180 | A * | 11/1998 | Khanna et al. | 705/30 |
| 5,974,391 | A * | 10/1999 | Hongawa | 705/7.26 |
| 6,047,260 | A * | 4/2000 | Levinson | 705/7.15 |
| 6,073,107 | A * | 6/2000 | Minkiewicz et al. | 705/7.17 |
| 6,240,395 | B1 * | 5/2001 | Kumashiro | 705/7.22 |
| 6,282,514 | B1 * | 8/2001 | Kumashiro | 705/7.11 |
| 6,415,196 | B1 * | 7/2002 | Crampton et al. | 700/100 |
| 6,501,473 | B1 * | 12/2002 | Hayes et al. | 345/440 |
| 6,715,130 | B1 * | 3/2004 | Eiche et al. | 715/210 |
| 6,745,184 | B1 * | 6/2004 | Choi et al. | 1/1 |
| 6,748,582 | B1 * | 6/2004 | Chiles et al. | 717/111 |
| 6,889,196 | B1 * | 5/2005 | Clark | 705/7.12 |
| 7,039,480 | B2 * | 5/2006 | Ooshima et al. | 700/97 |
| 7,080,026 | B2 * | 7/2006 | Singh et al. | 705/7.31 |
| 7,092,895 | B2 * | 8/2006 | Chappel et al. | 705/7.38 |
| 7,113,915 | B1 * | 9/2006 | Montemayor et al. | 705/7.13 |
| 7,149,699 | B2 * | 12/2006 | Barnard et al. | 705/7.26 |
| 7,213,234 | B1 * | 5/2007 | Below | 717/127 |
| 7,216,088 | B1 * | 5/2007 | Chappel et al. | 705/7.17 |
| 7,236,940 | B2 * | 6/2007 | Chappel | 705/7.31 |
| 7,313,531 | B2 * | 12/2007 | Chappel et al. | 705/7.17 |
| 7,509,626 | B1 * | 3/2009 | Barnes et al. | 717/101 |
| 7,571,454 | B2 * | 8/2009 | Potrebic et al. | 725/50 |
| 7,647,130 | B2 * | 1/2010 | Fischer et al. | 700/95 |
| 7,668,761 | B2 * | 2/2010 | Jenkins et al. | 705/28 |
| 7,669,179 | B2 * | 2/2010 | Gupta et al. | 717/101 |
| 7,698,248 | B2 * | 4/2010 | Olson | 706/56 |
| 7,743,369 | B1 * | 6/2010 | Srinivasan et al. | 717/155 |
| 7,810,067 | B2 * | 10/2010 | Kaelicke et al. | 717/102 |

(Continued)

OTHER PUBLICATIONS

P. Lakey, "A Hybrid Software Process Simulation Model for Project Management," in Proceedings of the 6th Process Simulation Modeling Workshop (ProSim 2003). Portland, Oregon, USA, 2003.*

(Continued)

*Primary Examiner* — Brett Feeney
(74) *Attorney, Agent, or Firm* — Patterson & Sheridan, LLP

(57) ABSTRACT

Automated methods for correcting the remaining portion of a project schedule in order to reflect actual performance to date are provided. For some embodiments, the remaining schedule is corrected by applying factors that are extrapolated from the actual completion times of project milestones in comparison to the scheduled times for the same milestones. This approach results in a project schedule that is more accurate, and thus enables improved management of the project.

10 Claims, 13 Drawing Sheets

(56) References Cited

U.S. PATENT DOCUMENTS

| | | | |
|---|---|---|---|
| 8,005,705 B2* | 8/2011 | Gura et al. | 705/7.26 |
| 8,224,472 B1* | 7/2012 | Maluf et al. | 700/97 |
| 8,280,756 B1* | 10/2012 | Kanemoto et al. | 705/7.12 |
| 2002/0065701 A1* | 5/2002 | Kim et al. | 705/9 |
| 2002/0198616 A1* | 12/2002 | Crampton et al. | 700/99 |
| 2003/0036942 A1* | 2/2003 | Wescott | 705/9 |
| 2003/0101089 A1* | 5/2003 | Chappel et al. | 705/10 |
| 2003/0225605 A1* | 12/2003 | Yokota et al. | 705/7 |
| 2004/0015375 A1* | 1/2004 | Cogliandro | 705/7 |
| 2004/0068517 A1* | 4/2004 | Scott | 707/104.1 |
| 2004/0143811 A1* | 7/2004 | Kaelicke et al. | 717/101 |
| 2004/0210473 A1* | 10/2004 | Goddard | 705/10 |
| 2005/0010459 A1* | 1/2005 | Kawabata et al. | 705/7 |
| 2005/0060213 A1* | 3/2005 | Lavu et al. | 705/7 |
| 2005/0216111 A1* | 9/2005 | Ooshima et al. | 700/99 |
| 2005/0289503 A1* | 12/2005 | Clifford | 717/101 |
| 2006/0053043 A1* | 3/2006 | Clarke | 705/8 |
| 2006/0129441 A1* | 6/2006 | Yankovich et al. | 705/8 |
| 2006/0253867 A1* | 11/2006 | Potrebic et al. | 725/50 |
| 2007/0150330 A1* | 6/2007 | McGoveran | 705/8 |
| 2007/0250335 A1* | 10/2007 | Hodges et al. | 705/1 |
| 2008/0082389 A1* | 4/2008 | Gura | 705/9 |
| 2008/0082956 A1* | 4/2008 | Gura et al. | 717/101 |
| 2008/0091486 A1* | 4/2008 | Aoyama et al. | 705/7 |
| 2008/0103859 A1* | 5/2008 | Yokota et al. | 705/7 |
| 2008/0103871 A1* | 5/2008 | Ruehl et al. | 705/9 |
| 2008/0114628 A1* | 5/2008 | Johnson et al. | 705/7 |
| 2008/0127041 A1* | 5/2008 | Gura | 717/101 |

OTHER PUBLICATIONS

Barbara Kitchenham and Stephen Linkman, University of Keele (1997). Estimates, Uncertainty and Risk. IEEE Software. May/Jun. 69-74.*

Edward R Carroll (2005). Estimating Software Based on Use Case Points. OOPSLA'05, Oct. 16-20, 2005, San Diego, California, USA. ACM. 1-9.*

Stutzke, R. Predicting Estimation Accuracy. In: The European software control and metrics conference—ESCOM, Alemanha, p. 211-220, 2000.*

Michelle L. Kilikauskas, Dirk Brade, Robert M. Gravitz, David H. Hall, Martha L. Hoppus, Ronald L. Ketcham, Robert O. Lewis, Michael L. Metz (2002). Estimating V&V Resource Requirements and Schedule Impact. An Invited Paper for Session B4 of the Foundations for V&V in the 21st Century Workshop Oct. 22-24. 1-106.*

* cited by examiner

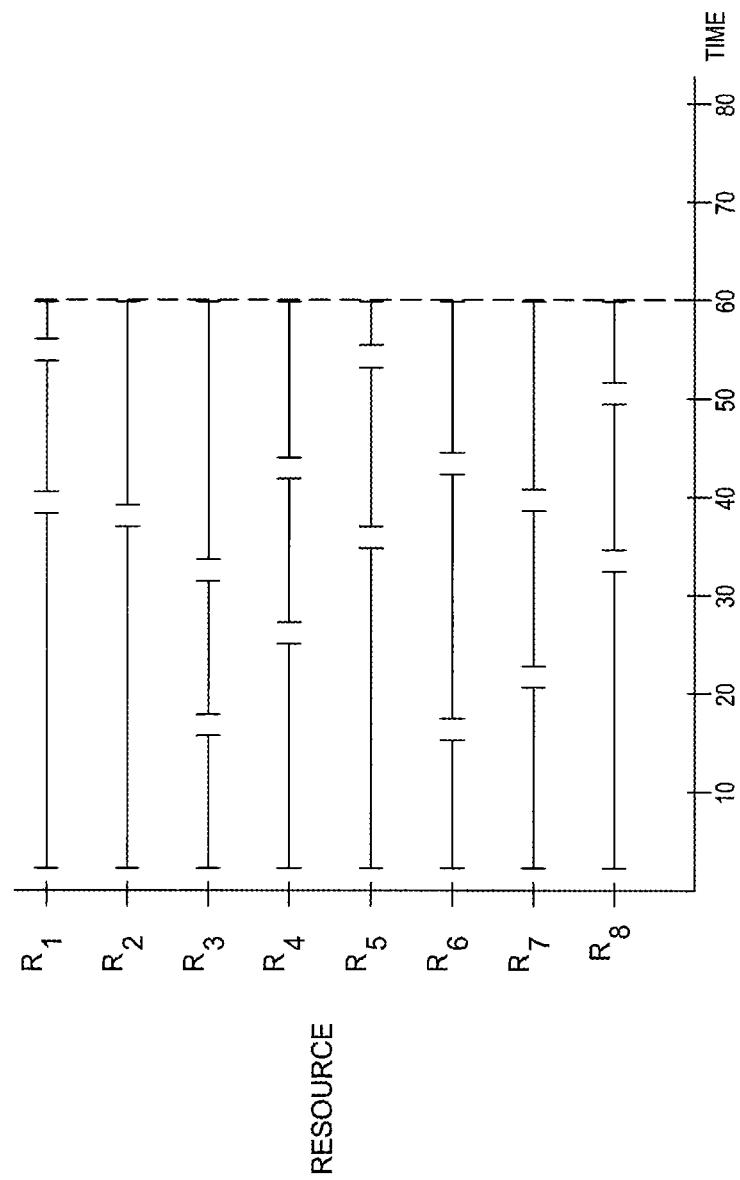

METHOD OF CORRECTING A PROJECT SCHEDULE

FIELD OF THE INVENTION

The present invention relates generally to the problem of scheduling resources in the field of project management.

BACKGROUND OF THE INVENTION

A project is a planned undertaking of specific tasks in order to accomplish a particular goal. The discipline of project management involves managing the available resources so that the project is completed in a timely fashion. Project management is typically used when a project comprises many separate tasks and resources, and thus becomes complex. In order for the management of a project to be successful, it is usually important to be able to accurately predict the timing and completion of the project.

The management of a project is generally bounded by three constraints: scope, time, and cost. These constraints are usually incorporated in the development of a project schedule. The project schedule is a plan that assigns the available resources to perform the required project tasks during specific time periods. The project schedule allows the calculation of planned completion times for critical tasks, as well as for the planned completion time for the project as a whole. The important points in the progress of the project, such as the completion of certain critical tasks, are known as project milestones. The accurate prediction of these milestones, including the project completion, is vital to the successful management of a project.

Typically, a project schedule is initially developed by identifying each project task, estimating the task durations, and assigning a resource to complete each task. Once the project begins, the project schedule is usually only changed when it is explicitly modified by a project manager. These changes are typically made on one task at a time, and involve adding new tasks, removing canceled tasks, changes to task duration, and changes to task dependencies. In projects with large numbers of tasks, the process of updating the schedule can be very time consuming and difficult. Thus, the changes that are made to the schedule are usually done on an ad-hoc basis, and are only made when there is a specific requirement for the change.

In addition, it is common in the management of projects that tasks that were not initially identified in the schedule are discovered during the course of the project. Obviously, this additional work can only be incorporated into the schedule after it has been discovered. This problem results in difficulty in planning the project and in accurately estimating the project completion date.

The fact that project schedules are subject to change means that the project manager will often have to reevaluate the resources allocated to a project. In order to perform this analysis, it can be beneficial to calculate the earliest possible completion time of the project as a baseline for comparison. However, in the prior art, the calculation of the earliest possible completion typically does not reflect the performance of the project resources.

Therefore, there is a need in the art for an automated method of correcting the remaining portion of a project schedule to reflect the actual performance to date. In addition, there is a need in the art to predict the amount of new work that will be discovered during the remaining portion of a project schedule. Finally, there is a need in the art to determine the earliest possible completion time of a project based on the performance of the project resources.

SUMMARY OF THE INVENTION

One embodiment provides a computer-implemented method of correcting a project schedule of a multi-task project. The method generally includes determining past time differentials between a scheduled time of completion and an actual time of completion for one or more completed tasks of the project, calculating one or more forecast correction factors, based on the determined past time differentials, calculating forecast time durations for one or more remaining tasks, based on previously entered time durations adjusted using the forecast correction factor, and correcting the project schedule to reflect the calculated forecast time durations for the remaining tasks.

Another embodiment of the present invention provides a computer-implemented method determining an earliest completion time of a project. The method generally includes summing time requirements for remaining tasks of the project, setting productivity estimates of a set of resources available to complete the tasks based on past productivity for the resources, determining available times of the resources, calculating production capacity of the resources based on the productivity estimates, and determining the time when the production capacity is equal to the sum of the time requirements for remaining project tasks.

Another embodiment of the present invention provides a computer-readable medium containing an intelligent scheduling application that accounts for past performance by performing operations. The operations generally include determining past time differentials between a scheduled time of completion and an actual time of completion for one or more completed tasks of the project, calculating one or more forecast correction factors, based on the determined past time differentials, calculating forecast time durations for one or more remaining tasks, based on previously entered time durations adjusted using the forecast correction factor, and correcting the project schedule to reflect the calculated forecast time durations for the remaining tasks.

Another embodiment provides a computer-readable medium containing an intelligent scheduling application that accounts for past performance by performing operations. The operations generally include determining the past incidence of discovering new work in addition to the scheduled tasks of the project, calculating the rate at which new work is discovered, based on the past incidence of discovering new work, calculating the new work that is forecast to be discovered during the remaining portion of the project, and adding the work that is forecast to be discovered during the remainder of the project to the project schedule.

BRIEF DESCRIPTION OF THE DRAWINGS

FIGS. 6A-B illustrate a project schedule timeline in an example application of a method to determine the earliest possible completion time of a project.

DETAILED DESCRIPTION

Embodiments of the present invention generally include an automated method of correcting the remaining portion of a project schedule in order to reflect actual performance to date. More specifically, the remaining schedule is corrected by applying factors that are extrapolated from the actual completion times of project milestones in comparison to the scheduled times for the same milestones. This approach results in a project schedule that is more accurate, and thus enables improved management of the project.

Embodiments of the present invention also include a method of predicting the amount of new work that will be discovered during the remaining portion of a project schedule. More specifically, the rate of work discovery in the past portion of the project is extrapolated to the remaining portion, and the schedule is adjusted accordingly. This approach results in a better estimate of the work required and a more accurate completion date.

Correction for Past Performance

Figure 1A:
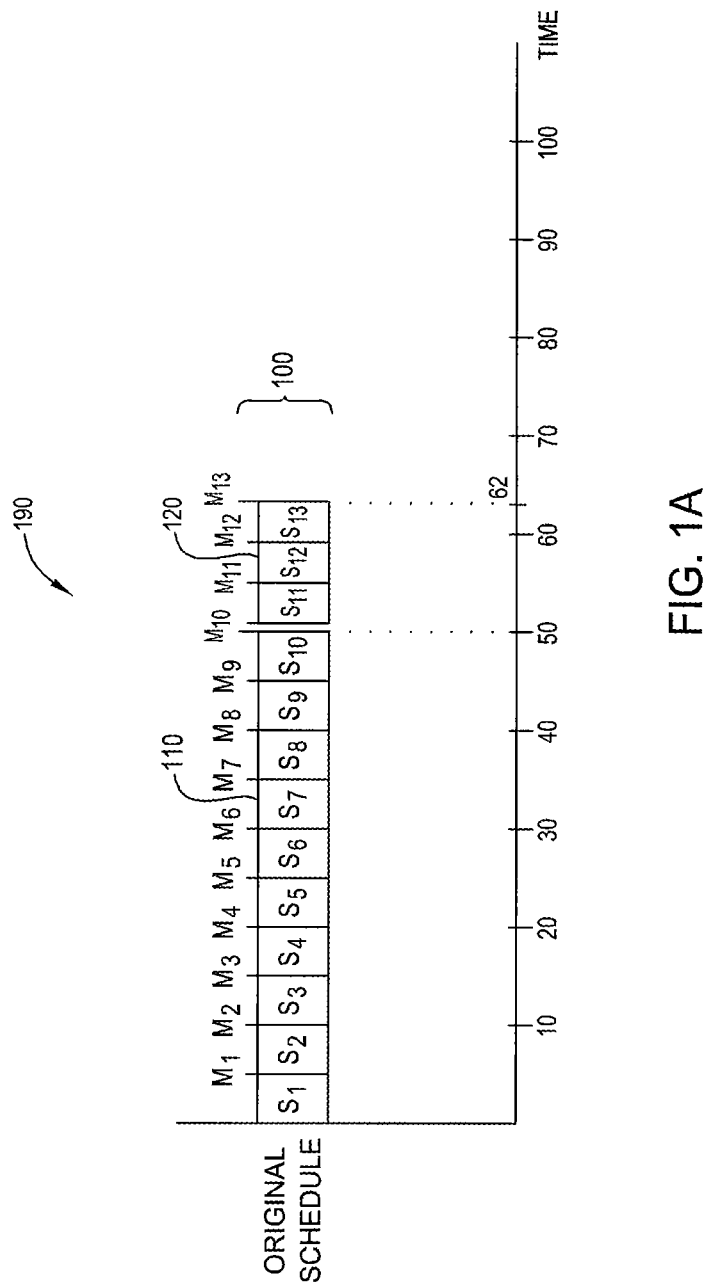
FIGS. 1A-C illustrate a project schedule timeline in an example application of a method of correcting the remaining portion of a schedule to reflect past performance.
Figure 1B:
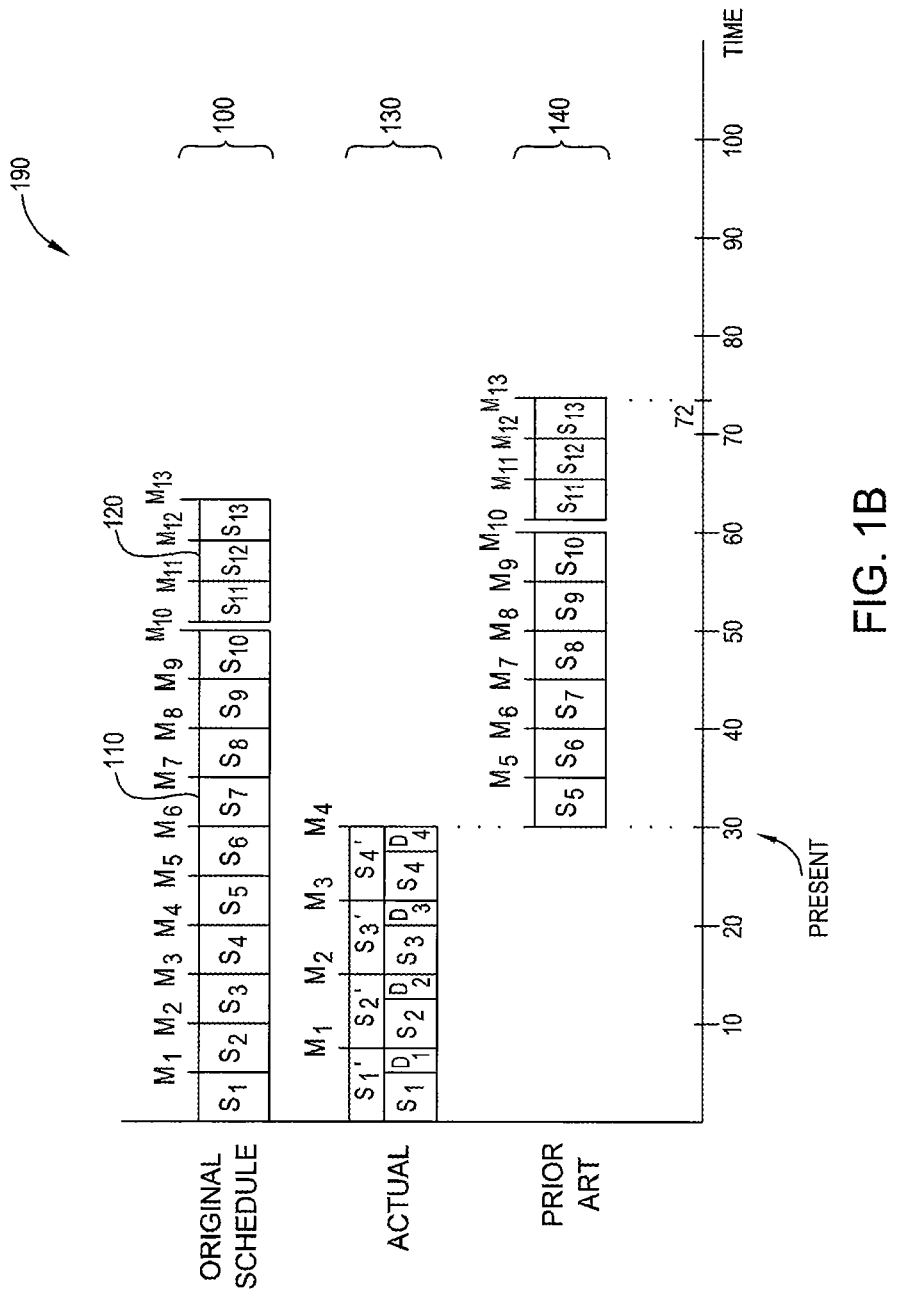
Figure 1C:
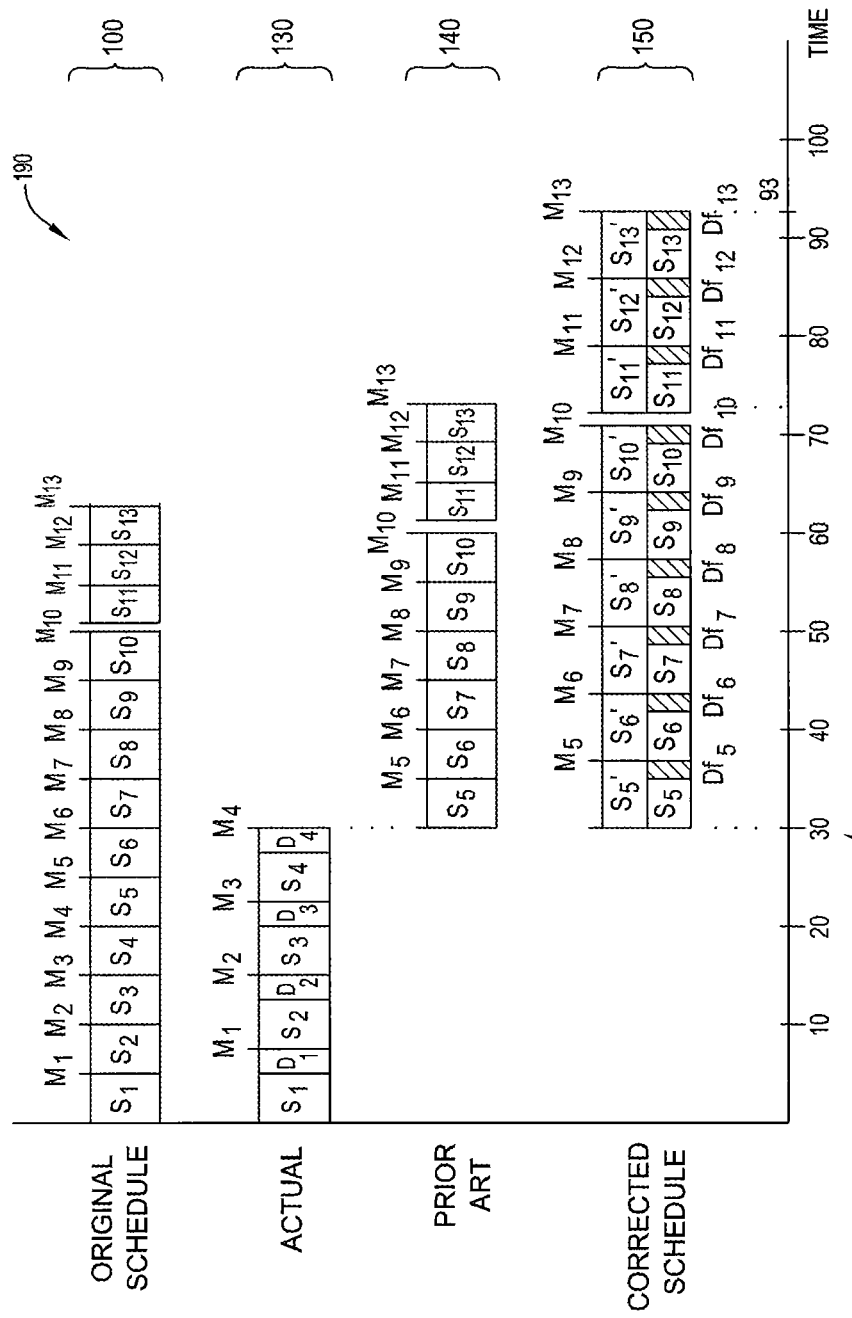

FIGS. 1A-C illustrate a project schedule timeline in an example application of a method of correcting the remaining portion of a schedule to reflect past performance. FIG. 1A illustrates a project timeline graph 190, comprising a project schedule timeline 100 for a single project resource $R_1$. The horizontal axis of the graph represents time. As shown, resource $R_1$ is scheduled to perform task A, which is represented by a bar 110. In this example, task A is scheduled begin at the start of the project (T=0), and is scheduled to be completed at time T=50 hours. When task A is complete, resource $R_1$ is scheduled to immediately begin task B, represented by bar 120. Task B is scheduled for 12 hours. Therefore, the project schedule timeline 100 for resource $R_1$ ends at T=62 hours, when task B is completed. It should be noted that, while this example is set in terms of hours, embodiments of this invention are not limited to any specific units of time.

In this example, task A comprises ten milestones ($M_1$-$M_{10}$) corresponding to critical points of progress in the task, including the completion of the task ($M_{10}$). The duration of time between milestones is shown as time segments $S_1$-$S_{10}$. In this example, each milestone represents the completion of 10% of the total work of task A. Thus, each of the time segments $S_1$-$S_{10}$ is equal to 5 hours, or 10% of the total scheduled time for task A. Similarly, task B comprises three equally-spaced milestones ($M_{11}$-$M_{13}$), with time segments $S_{11}$-$S_{13}$ of 4 hours each. Alternatively, a task could comprise any number of milestones, and could comprise time segments of unequal durations.

The timeframe (i.e., the assumed present time) associated to FIG. 1A is before T=0, so the task has not been started. At this point in time, there is no actual performance data available for this task or resource, so the forecast completion time of T=50 has been based on an assumed productivity rate for resource $R_1$.

FIG. 1B illustrates the project timeline graph 190 at time T=30, or 30 hours into the project. As shown, FIG. 1B illustrates a partially completed timeline 130, representing the portion of the task A that has been actually completed as of time T=30. FIG. 1B includes a remaining schedule timeline 140, representing the portion of the task A that has remains to be completed as of time T=30, as well as all of remaining task B. The original schedule timeline 100 has also been included for the purpose of comparison. At T=30, the task A has been completed to milestone $M_4$, thus representing that task A is 40% complete. Each of the past milestones $M_1$-$M_4$ was not completed by the scheduled time, as shown in FIG. 1A. Rather, each of the first four milestones $M_1$-$M_4$ was actually completed late, as shown in FIG. 1B.

As illustrated in FIG. 1B, the past time segments $S_1'$-$S_4'$ are the amounts of time that actually elapsed before milestones $M_1$-$M_4$, respectively. By way of example, the past time segment $S_1'$, as shown, comprises the original time segment $S_1$ plus the actual differential time $D_1$. Thus, the actual differential time $D_1$ is equal to the amount of time by which milestone $M_1$ was late. Of course, it is envisioned that the milestone $M_1$ could be completed early, in which case the actual differential time $D_1$ would be a negative amount of time. Likewise, the other past time segments $S_2'$-$S_4'$ are comprised of the original time segments $S_2$-$S_4$ and the actual differential times $D_2$-$D_4$, respectively.

As illustrated in FIG. 1B, the remaining schedule timeline 140 is the portion of the original schedule timeline 100 that remains to be completed as of time T=30. As shown, the remaining milestones $M_5$-$M_{13}$ have been pushed out to reflect the fact that the antecedent milestone $M_4$ was completed at T=30, and not as originally scheduled at T=20. As shown in FIG. 1B, if the determination of the remaining schedule timeline 140 is performed according to the prior art, the remaining time segments $S_5$-$S_{13}$ remain unchanged, but are now delayed by 10 hours. Therefore, the overall completion time at $M_{13}$ is now scheduled to be T=72, rather than T=62 as originally scheduled.

FIG. 1C illustrates one embodiment of the present invention. As shown, the forecast schedule timeline 150 represents the forecast time segments $S_5'$-$S_{13}'$ and milestones $M_5$-$M_{13}$ as determined according to one embodiment of the invention. For example, the forecast time segment $S_5'$, as shown, comprises the original time segment $S_5$ plus the forecast differential time $Df_5$. Likewise, the other forecast time segments $S_6'$-$S_{13}'$ are comprised of the original time segments $S_6$-$S_{13}$ and the forecast differential times $Df_6$-$Df_{13}$, respectively.

Figure 2:
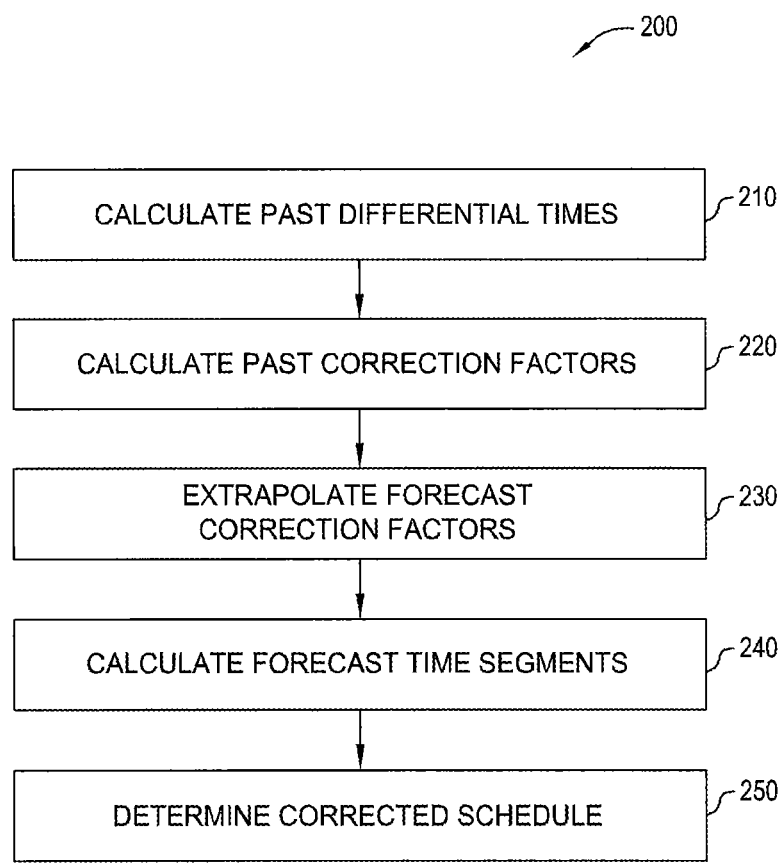
FIG. 2 illustrates a method of correcting the remaining portion of a schedule to reflect past performance.

In this embodiment, the forecast schedule timeline 150 of FIG. 1C is determined by using the method 200 illustrated in FIG. 2. In the following section, the method 200 is explained by referring to examples from FIG. 1C, which are given in parentheses. The method 200 begins at step 210, where the past differential times (e.g., $D_1$ of FIG. 1C) are calculated as the differences between the actual times ($S_1'$) and the scheduled times ($S_1$) for the completed milestones ($M_1$). That is:

$$D_1 = S_1' - S_1$$

At step 220, the past correction factors ($F_1$) are calculated by dividing the actual times taken to achieve the milestones ($S_1'$) by the time originally scheduled for the same work ($S_1$). That is:

$$F_1 = S_1'/S_1$$

At step 230, the forecast correction factors for future milestones are calculated by extrapolating from the correction factors for the completed milestones. If multiple milestones have been completed, and multiple milestones remain to be completed, it may be beneficial to assign a different correction factor to each future milestone.

At step 240, the forecast time segments (e.g., $S_6'$) are calculated by multiplying the remaining time segments ($S_6$) by the corresponding forecast correction factors. That is:

$$S_6' = S_6 \times F$$

$$S_6' = 5 \times 1.5$$

$$S_6' = 7.5 \text{ hours}$$

At step 250, the project schedule is evaluated with the forecast time segments (e.g., $S_6'$-$S_{13}'$) to determine the corrected schedule (timeline 150) for the remaining milestones.

Figure 3A:
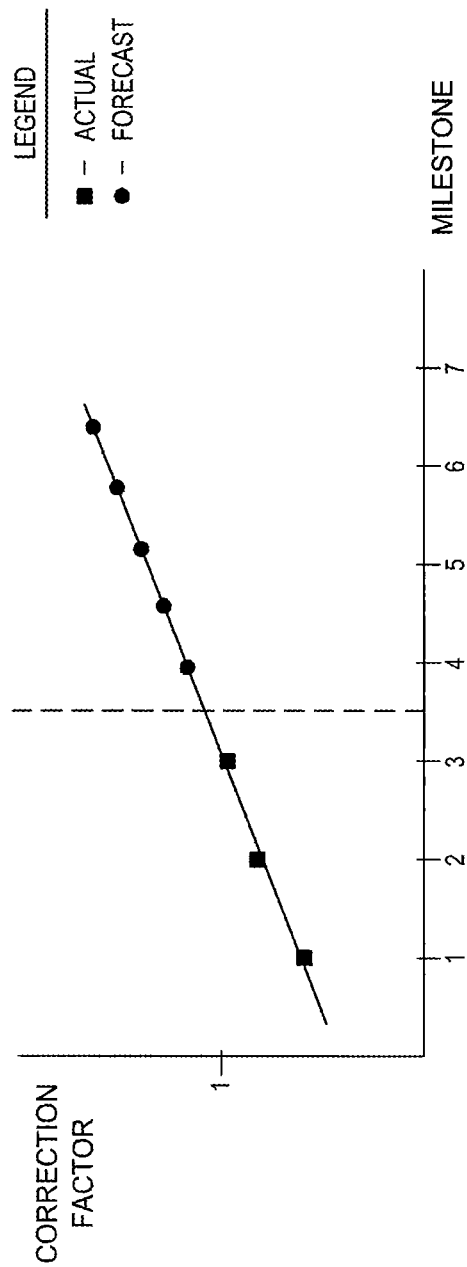
FIGS. 3A-C illustrate examples of various extrapolations of correction factors.

In one embodiment, the extrapolation of the forecast correction factors (step 230) can be performed using various methods known in the art, such as a least-squares linear fit, or a polynomial curve-fit. For example, FIG. 3A illustrates a project in which the correction factors have increased linearly as the milestones have been completed. In this example, correction factor $F_1$ corresponds to the performance to schedule for milestone $M_1$, and is calculated by dividing the actual time required to complete milestone $M_1$ by the original time scheduled to complete milestone $M_1$. Correction factors $F_2$, $F_3$, and $F_4$ likewise correspond to the performance to schedule for milestones $M_2$, $M_3$, and $M_4$, respectively. The line formed by the past correction factors can thus be extrapolated forward to determine the forecast correction factors. The linear extrapolation can be performed using methods known in the art, for example the least-squares method. As shown in FIG. 3A, the use of a linear extrapolation 310 provides the forecast correction factors $F_6$-$F_{13}$, corresponding to milestones $M_6$-$M_{13}$, respectively.

Figure 3B:
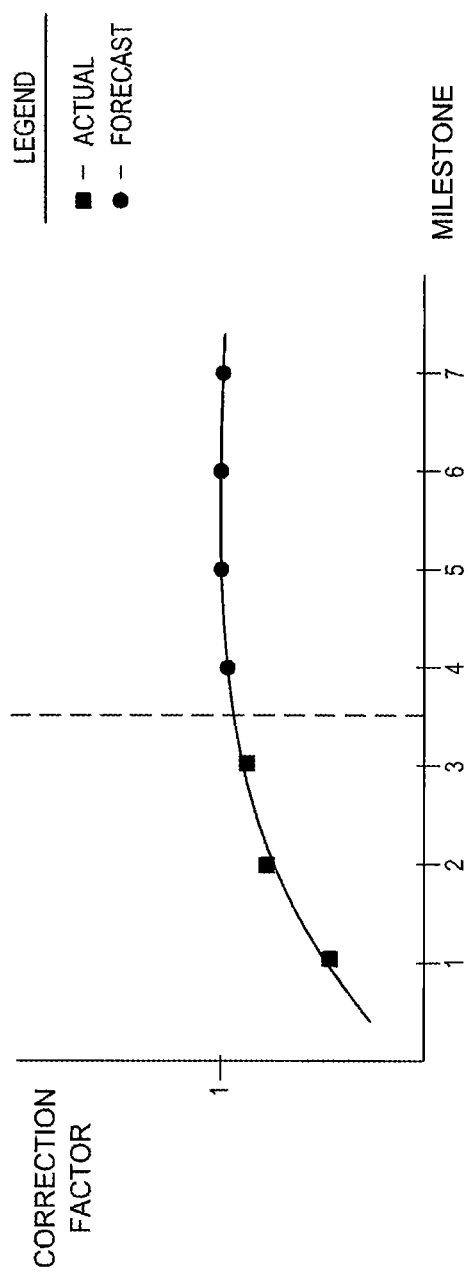
Figure 3C:
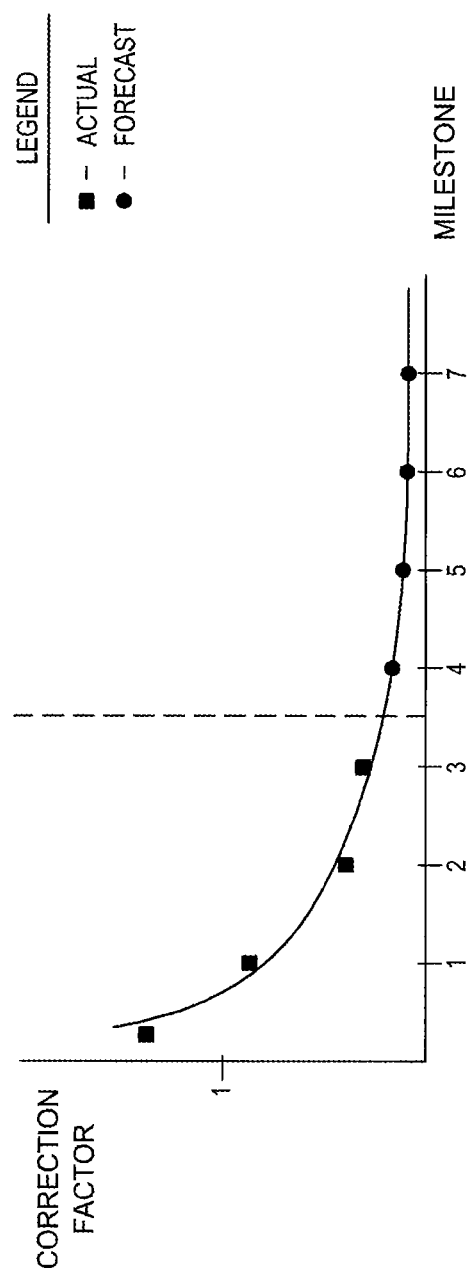

FIG. 3B illustrates an example in which each successive correction factor is larger than the one for the previous milestone, but the amount by which each one increases is less for each milestone. In cases such as this one, it is well known in the art that an extrapolation can be performed using a polynomial curve-fit, such as curve 320 shown in FIG. 3B. Similarly, FIG. 3C illustrates an example wherein each successive correction factor is smaller than the previous one. In this example, an extrapolation can be performed by using a polynomial curve-fit 330.

Alternatively, a single overall correction factor could be applied to all remaining time segments. The overall correction factor can be calculated by dividing the actual time elapsed by the time scheduled to achieve the same progress. In the example provided in FIG. 1C, the overall correction factor is calculated as:

$$F = (S_1' + S_2' + S_3' + S_4')/(S_1 + S_2 + S_3 + S_4)$$

$$F = 30/20$$

$$F = 1.5$$

To facilitate understanding, the previous example involved the schedule of a single project resource. However, it is envisioned that the methods described here can be applied to multiple resources working on a project by performing the method separately for each resource. It is also envisioned that the method can be adapted to aggregate multiple resources together, as it may be beneficial to perform a single set of calculations for the entire project. In addition, it may be beneficial to store the correction factors by resource in order to evaluate the productivity of each resource.

New Work Discovery

For one embodiment of the invention, the project schedule can be adjusted to reflect the expected discovery of new work. Even when project schedules have been finalized and the scheduled work has been started, it is common to discover additional tasks that were not initially contemplated. This additional work is often the result of changed circumstances or unforeseen factors. The ability to forecast the discovery of additional work permits a more accurate project schedule, and thus improves the ability of a project manager to react to schedule changes.

Figure 4A:
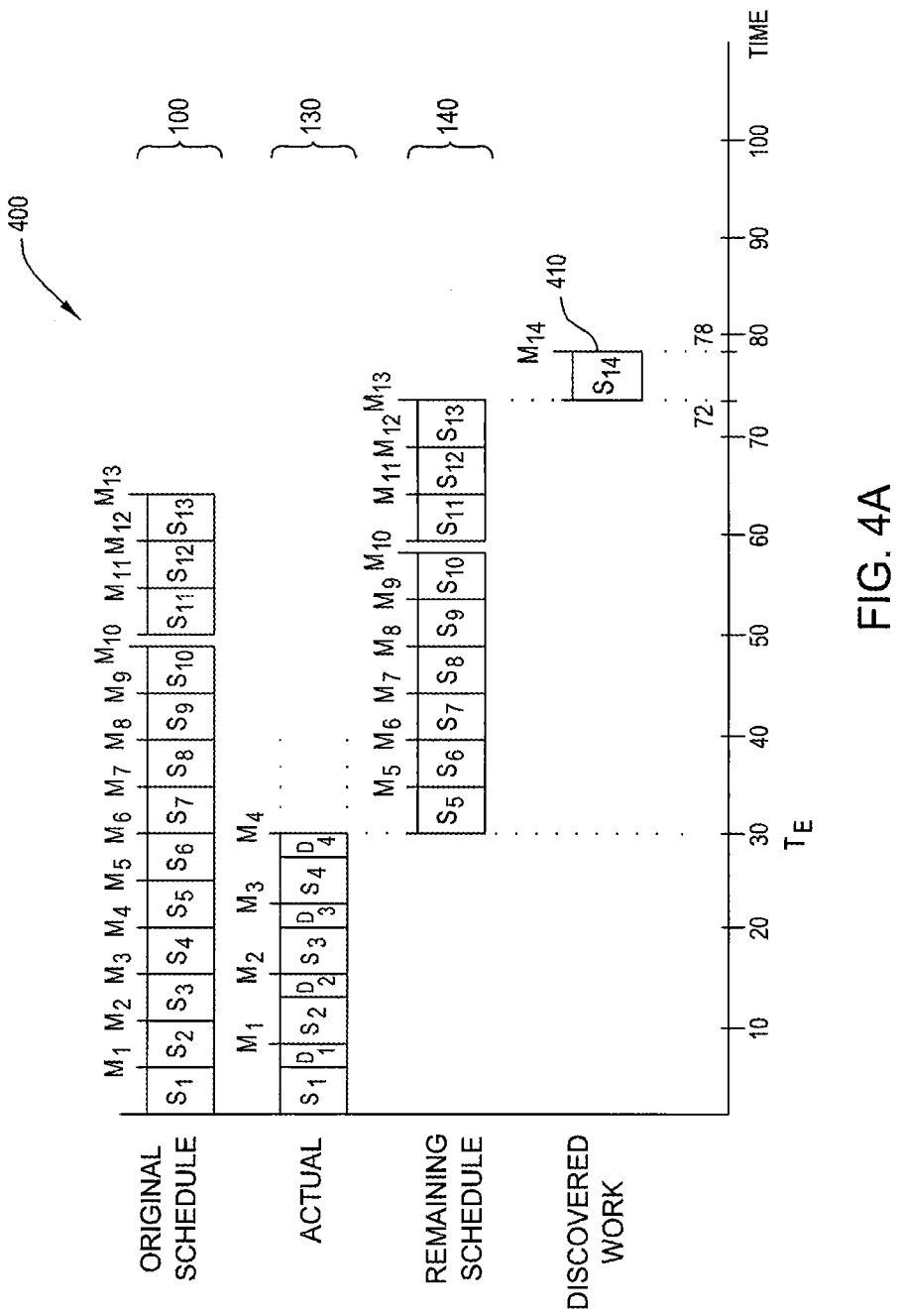
FIGS. 4A-B illustrate a project schedule timeline in an example application of a method to adjust the remaining portion of a schedule to reflect the forecast discovery of new work.
Figure 4B:
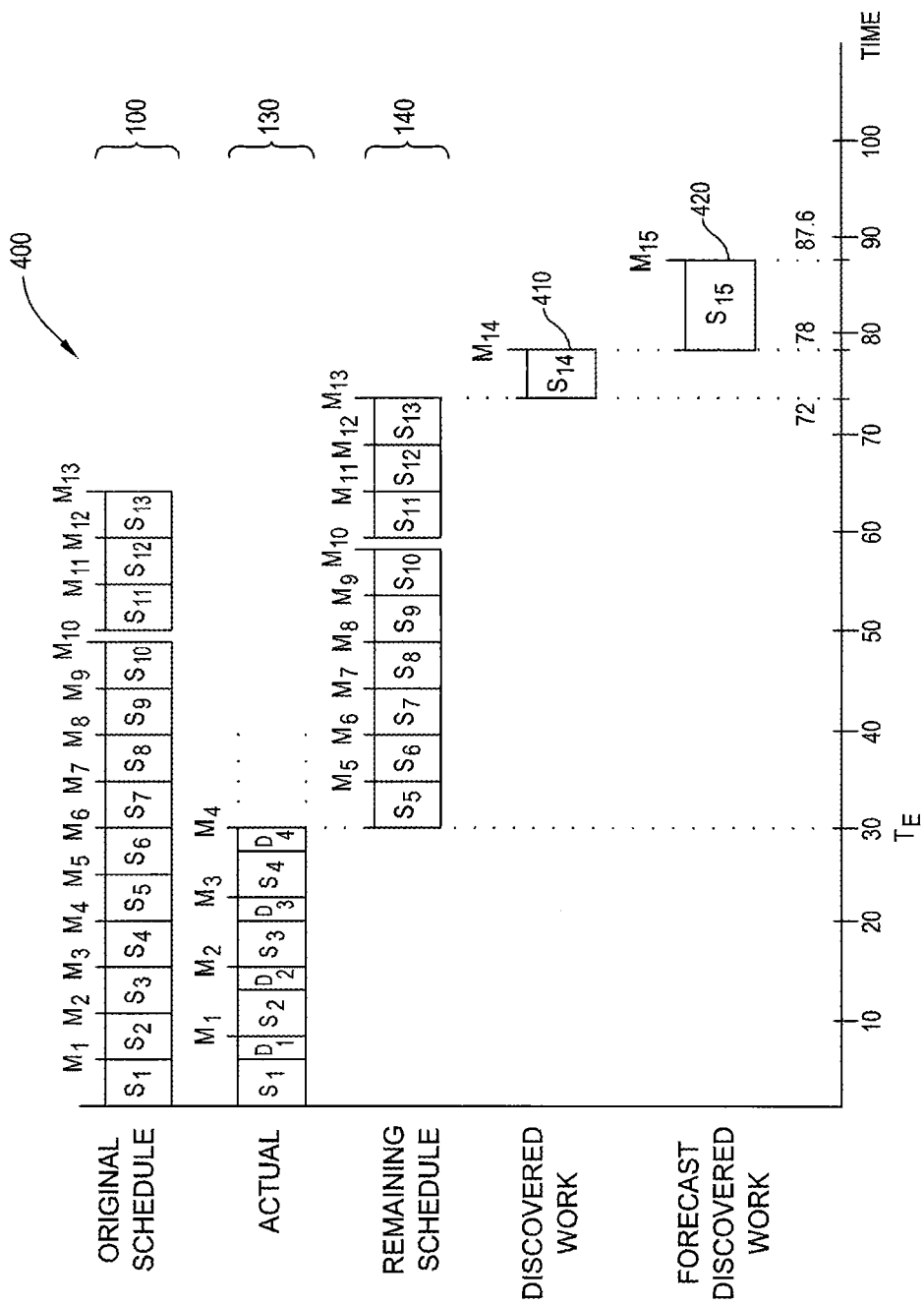

FIGS. 4A-B illustrate a project schedule timeline in an example application of a method to adjust the remaining portion of a schedule to reflect the forecast discovery of new work. FIG. 4A illustrates the project timeline graph 400 for resource $R_1$ as of time T=30, similar to the project timeline graph 190 shown in FIG. 1C. As in the previous example, the completion of the milestones $M_1$-$M_4$ has taken more time than was originally scheduled, resulting in a revised scheduled completion of T=72.

In this example, a new task C 410 has been discovered during the time elapsed $T_E$=30. As shown, the duration of task C is represented by time segment $S_{14}$, equal to 6 hours. When the new task C is taken into account in the project schedule, the project completion time is delayed by 6 hours, to T=78. However, this completion time does not take into account the possibility of the future discovery of more tasks. In order to have a more accurate prediction of the project completion time, the schedule should incorporate an estimate of the time required for tasks that will be discovered in the remainder of the project.

In one embodiment, the work that will be discovered in the remaining project time is predicted by extrapolating from the past incidence of discovered work. As illustrated in FIG. 4B, a new task E 420, representing the work forecast to be discovered during the remainder of the project, has been added to the project timeline graph 400. With the addition of task E, the scheduled project completion time is updated to T=87.6. By incorporating the expected discovery of new task E, the project schedule is expected to more accurately predict the project completion time.

Figure 5:
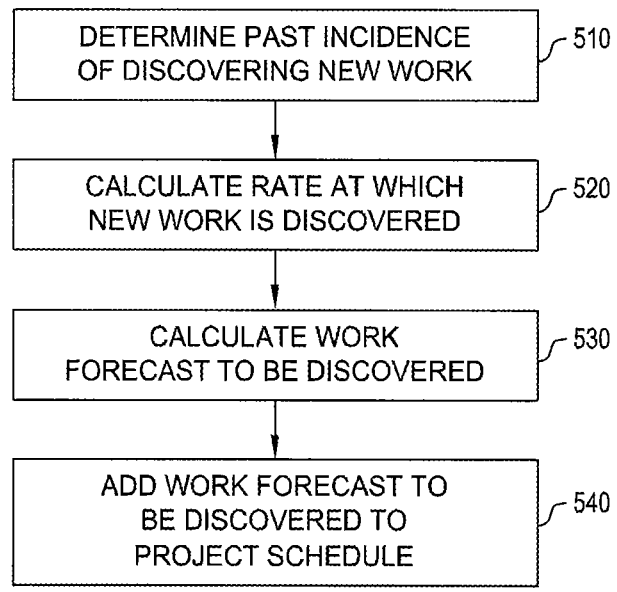
FIG. 5 illustrates a method of adjusting the remaining portion of a schedule to reflect the expected discovery of new work

In this embodiment, the duration of task E is determined by using the method 500 illustrated in FIG. 5. In the following section, the method 500 is explained by referring to examples from FIG. 4B, which are given in parentheses. The method 500 begins at step 510, where the past incidence of discovering new work is determined. In the example of FIG. 4B, the work discovered during the elapsed time $T_E$ was task C 410.

At step 520, the new work factor N is calculated by dividing the time of the previously discovered tasks $T_{PD}$ (e.g., $S_{14}$) by the time elapsed $T_E$ (T=30). That is:

$$N = T_{PD}/T_E$$

In the example of FIG. 4B:

$$N = S_{14}/T_E$$

$$N = 6/30 = 0.2$$

At step 530, the work forecast to be discovered in the remainder of the project ($T_{FD}$) is calculated by multiplying the new work factor N by the time remaining in the project ($T_R$). That is:

$$T_{FD} = N \times T_R$$

In the example of FIG. 4B:

$$T_{FD} = 0.2 \times 48 = 9.6$$

At step 540, the time for the work forecast to be discovered in the remainder of the project ($T_{FD}$) is added to the time remaining in the project ($T_R$) to determine the corrected projection completion time. The new work factor N may be calculated for the time elapsed as a whole, and is applied to the remaining time as a whole. Alternatively, it may be beneficial to extrapolate the probability factor for each milestone in order to reflect an increasing or decreasing probability over time. The extrapolation of the probability factors could be done with a linear fit or curve fit.

Determination of Earliest Possible Completion Time

For one embodiment of the invention, a determination is made of the earliest possible completion of the project. It is known in the art that some project schedules may be made shorter by reallocating the existing resources, or by adding new resources. In performing this type of resource analysis, it is often beneficial to establish the earliest possible completion time (hereafter "EPCT") as a baseline for comparison.

Figure 6A:
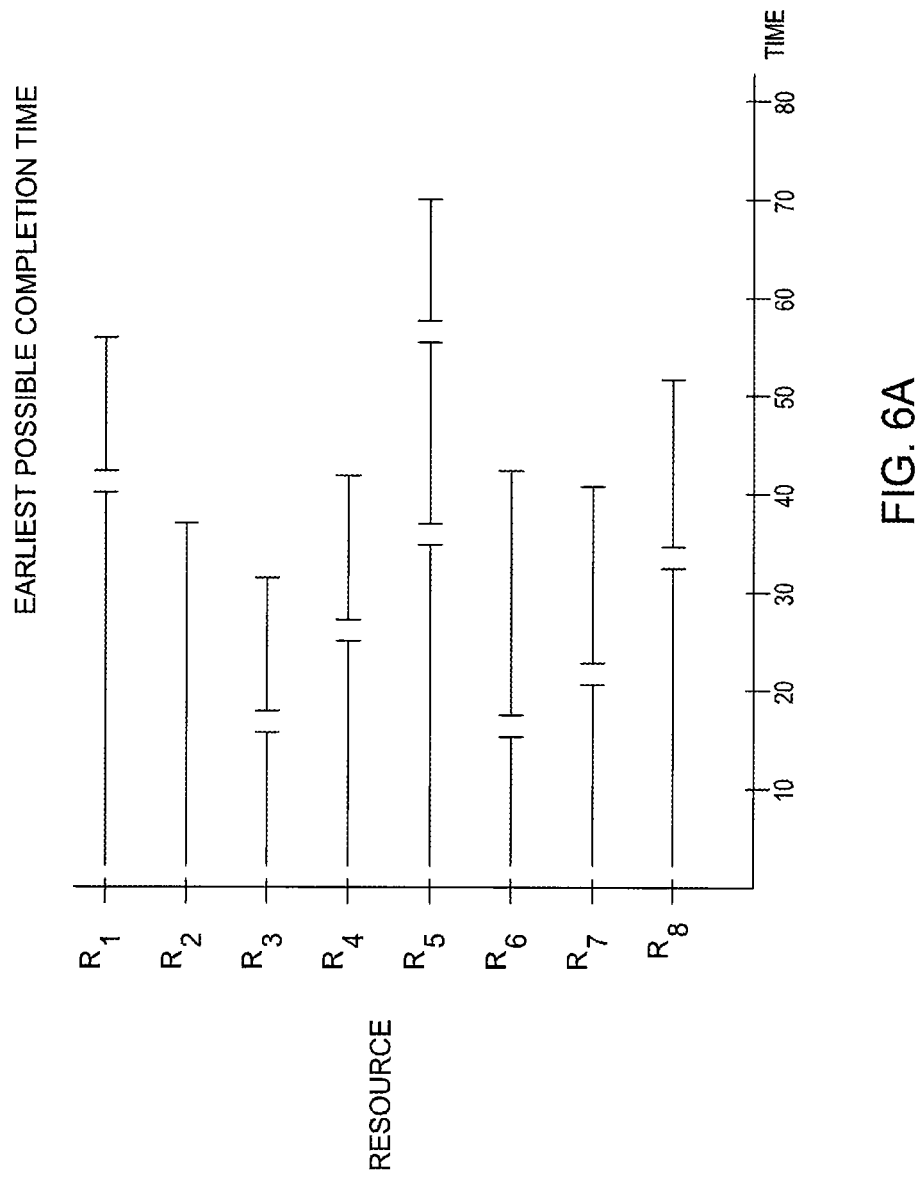

FIG. 6A illustrates a project timeline graph 600 for a project with multiple resources $R_1$-$R_8$. In this example, the tasks assigned to each resource are scheduled to end at different times. As shown, the resource $R_5$ is scheduled to finish last, at time T=70. Thus, the entire project is constrained by resource $R_5$ to not finish until T=70. FIG. 6B illustrates one embodiment of the invention, whereby the tasks allocated to the various resources $R_1$-$R_8$ are instead assumed to be distributed to all available resources so that they finish simultaneously. In this example, the EPCT is determined to be T=60.

Figure 7:
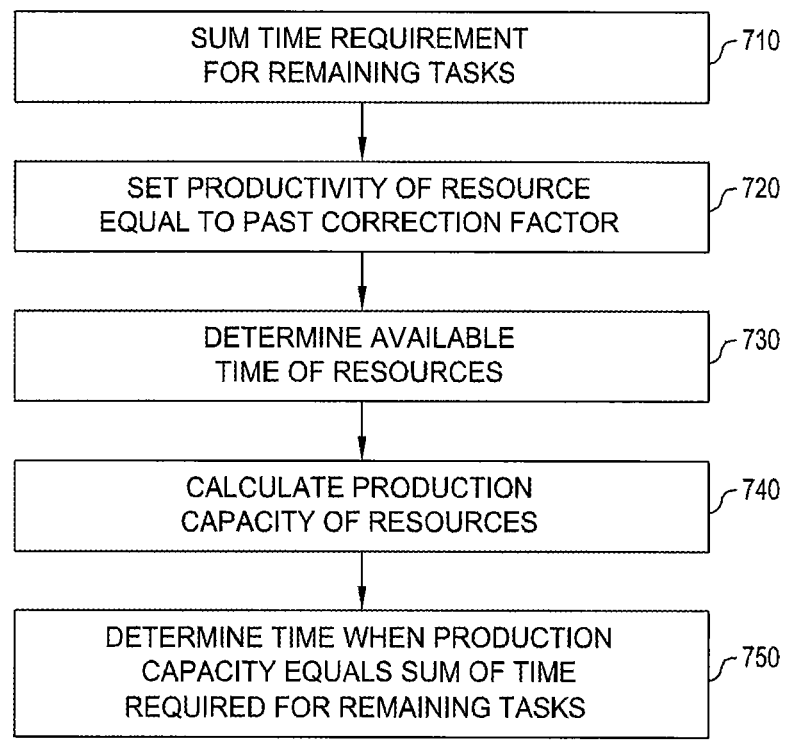
FIG. 7 illustrates a method to determine the earliest possible completion time of a project.

In this embodiment, the EPCT is determined by the method 700 illustrated in FIG. 7. The method 700 begins at step 710, where the time requirements of the remaining tasks are summed. At step 720, the productivity of each project resources is assumed to be equal to the correction factor F of each resource, as determined by method 200. Of course, a person of skill in the art will recognize that the productivity of the resources can be based on historical data from previous projects, or can be assigned based on various other criteria such as experience, education, etc.

At step 730, the schedule of available time of each resource is determined. At step 740, the production capacity of each resource is calculated by multiplying the resource correction factor F by the resource available time A. At step 750, the EPCT is determined by solving for the time T at which the sum of the production capacities of the resources equals the time requirements of the remaining tasks. The EPCT is the time when all available resources complete the remaining tasks simultaneously.

CONCLUSION

Embodiments of the present invention may allow for better and more accurate scheduling by taking into consideration past performance. While the foregoing is directed to embodiments of the present invention, other and further embodiments of the invention may be devised without departing from the basic scope thereof, and the scope thereof is determined by the claims that follow.

What is claimed is:

1. A computer-implemented method of correcting a project schedule that includes forecast completion times for a plurality of milestones associated with one or more tasks, comprising:

analyzing the project schedule to determine a time differential for a completed milestone of the plurality of milestones, wherein the time differential is determined by calculating a difference between a forecast completion time for the completed milestone and an actual completion time for the completed milestone;

calculating a past correction factor for an incomplete milestone of the plurality of milestones by dividing an actual time taken to complete the incomplete milestone by a time originally scheduled for the incomplete milestone;

extrapolating one or more correction factors based on the time differential for the completed milestone and the past correction factor for the incomplete milestone;

calculating, via a processor, an adjusted forecast completion time for the incomplete milestone based on the extrapolated one or more correction factors;

correcting the project schedule based on the adjusted forecast completion time for the incomplete milestone; and specifying an updated forecast completion time for the incomplete milestone.

2. The method of claim 1, wherein the step of extrapolating one or more correction factors further comprises extrapolating a single past correction factor.

3. The method of claim 1, wherein the step of extrapolating one or more correction factors further comprises extrapolating determining multiple correction factors based on a single time differential.

4. The method of claim 1, wherein the one or more forecast correction factors are determined by applying a line fit algorithm.

5. The method of claim 1, wherein the one or more forecast correction factors are determined by applying a curve fit algorithm.

6. A non-transitory computer-readable medium storing instructions that, when executed by a processor, cause a computer system to correct a project schedule that includes forecast completion times for a plurality of milestones associated with one or more tasks, by performing the steps of:

analyzing the project schedule to determine a time differential for a completed milestone of the plurality of milestones, wherein the time differential is determined by calculating a difference between a forecast completion time for the completed milestone and an actual completion time for the completed milestone;

calculating a past correction factor for an incomplete milestone of the plurality of milestones by dividing an actual time taken to complete the incomplete milestone by a time originally scheduled for the incomplete milestone;

extrapolating one or more correction factors based on the time differential for the completed milestone and the past correction factor for the incomplete milestone;

calculating, via a processor, an adjusted forecast completion time for the incomplete milestone based on the extrapolated one or more correction factors;

correcting the project schedule based on the adjusted forecast completion time for the incomplete milestone; and specifying an updated forecast completion time for the incomplete milestone.

7. The non-transitory computer-readable medium of claim 6, wherein the step of extrapolating one or more correction factors further comprises extrapolating a single past correction factor.

8. The non-transitory computer-readable medium of claim 6, wherein the step of extrapolating one or more correction factors further comprises extrapolating determining multiple correction factors based on a single time differential.

9. The non-transitory computer-readable medium of claim 6, wherein the one or more forecast correction factors are determined by applying a line fit algorithm.

10. The non-transitory computer-readable medium of claim 6, wherein the one or more forecast correction factors are determined by applying a curve fit algorithm.

* * * * *